US010948029B2

(12) United States Patent
Trinkenschuh

(10) Patent No.: US 10,948,029 B2
(45) Date of Patent: Mar. 16, 2021

(54) CLUTCH SYSTEM

(71) Applicant: Schaeffler Technologies AG & Co. KG, Herzogenaurach (DE)

(72) Inventor: Andreas Trinkenschuh, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 142 days.

(21) Appl. No.: 16/083,906

(22) PCT Filed: Feb. 17, 2017

(86) PCT No.: PCT/DE2017/100127
§ 371 (c)(1),
(2) Date: Sep. 11, 2018

(87) PCT Pub. No.: WO2017/157373
PCT Pub. Date: Sep. 21, 2017

(65) Prior Publication Data
US 2019/0085910 A1    Mar. 21, 2019

(30) Foreign Application Priority Data

Mar. 16, 2016   (DE) .................... 102016204290.4

(51) Int. Cl.
*F16D 21/08*    (2006.01)
*F16D 23/12*    (2006.01)
(Continued)

(52) U.S. Cl.
CPC ............ *F16D 21/08* (2013.01); *F16D 23/12* (2013.01); *F16D 27/108* (2013.01);
(Continued)

(58) Field of Classification Search
CPC ........ F16D 21/08; F16D 23/12; F16D 27/108; F16D 27/112; F16D 27/115; F16D 27/14; F16D 2023/123; F16D 1200/1066
See application file for complete search history.

(56) References Cited

U.S. PATENT DOCUMENTS

| 5,943,911 | A | * | 8/1999 | Beckerman | ........... F16D 27/115 |
| | | | | | 192/35 |
| 6,062,330 | A | * | 5/2000 | Watson | ................ B60K 17/342 |
| | | | | | 180/197 |

(Continued)

FOREIGN PATENT DOCUMENTS

| CN | 1105836 C | 8/1995 |
| CN | 1176353 A | 3/1998 |

(Continued)

*Primary Examiner* — Tinh Dang
(74) *Attorney, Agent, or Firm* — LeKeisha M. Suggs

(57) ABSTRACT

A clutch system for coupling a drive shaft of a motor vehicle engine to a transmission input shaft of a motor vehicle transmission is disclosed. The clutch system includes a friction clutch for transmitting a torque between a torque-introducing element and a torque-discharging element. It also includes a ramp system for an axial displacement of a pressure plate of the friction clutch, wherein the ramp system has an input ramp and an output ramp, which can be turned in relation to the input ramp to change an axial extent of the ramp system. A pilot clutch, which acts on the ramp system, is provided for actuating the friction clutch based on a differential speed between the torque-introducing element and the torque-discharging element. An electromagnet for a magnetic actuation of the pilot clutch is further provided, wherein the ramp system is arranged radially within the friction clutch and/or the pilot clutch.

13 Claims, 1 Drawing Sheet

(51) Int. Cl.
*F16D 27/108* (2006.01)
*F16D 27/112* (2006.01)
*F16D 27/115* (2006.01)
*F16D 27/14* (2006.01)

(52) U.S. Cl.
CPC .......... F16D 27/112 (2013.01); F16D 27/115 (2013.01); F16D 27/14 (2013.01); F16D 2023/123 (2013.01); F16D 2500/1066 (2013.01)

(56) References Cited

U.S. PATENT DOCUMENTS

| | | | |
|---|---|---|---|
| 6,296,590 | B1 * | 10/2001 | Gassmann ...... B60W 30/18145 475/231 |
| 6,790,154 | B1 * | 9/2004 | Kelley, Jr. .............. B60K 17/35 180/249 |
| 6,837,351 | B2 * | 1/2005 | Showalter ............. F16D 27/115 192/35 |
| 6,905,008 | B2 * | 6/2005 | Kowalsky ............. F16D 27/115 192/35 |
| 6,935,475 | B2 * | 8/2005 | Weilant ................. F16D 27/115 180/247 |
| 2003/0094343 | A1 | 5/2003 | Showalter |
| 2003/0132082 | A1 | 6/2003 | Kwoka |
| 2010/0236888 | A1 | 9/2010 | Pritchard et al. |
| 2011/0048884 | A1 | 3/2011 | Kim et al. |

FOREIGN PATENT DOCUMENTS

| | | |
|---|---|---|
| DE | 10101407 C1 | 6/2002 |
| DE | 10 2014 205840 A1 | 10/2014 |
| DE | 102014213486 A1 | 1/2015 |
| EP | 1178233 A2 | 2/2002 |
| EP | 1510715 A1 | 3/2005 |
| WO | 2011050773 A1 | 5/2011 |
| WO | 2013186102 A1 | 12/2013 |

* cited by examiner

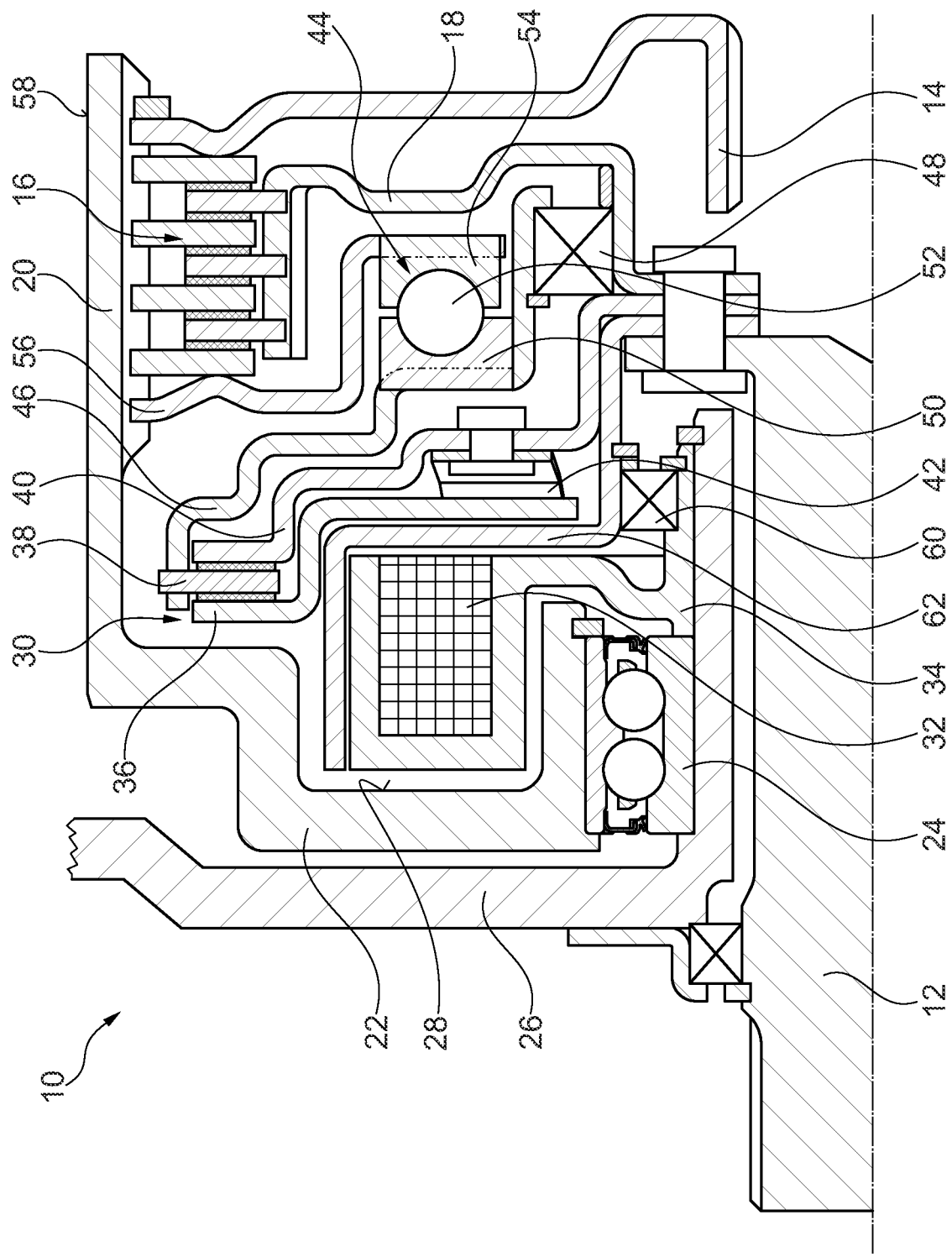

CLUTCH SYSTEM

CROSS-REFERENCE TO RELATED APPLICATIONS

This application is the U.S. National Phase of PCT Appln. No. PCT/DE2017/100127 filed Feb. 17, 2017, which claims priority to DE 10 2016 204 290.4 filed Mar. 16, 2016, the entire disclosures of which are incorporated by reference herein.

TECHNICAL FIELD

The present disclosure relates to a clutch system, with the aid of which a drive shaft of a motor vehicle engine can be coupled to at least one transmission input shaft of a motor vehicle transmission, in particular in a hybrid motor vehicle.

BACKGROUND

WO 2011/050773 A1 discloses a clutch system in the form of a so-called booster clutch in which a friction clutch, designed as a separating clutch, can be actuated with the aid of a ramp system. For closing the friction clutch, the ramp system can change its axial extent by an output ramp that can turn in relation to an input ramp, and thereby axially displace a pressure plate of the friction clutch. As a result, a clutch disk can be frictionally clamped between the pressure plate and a counter plate of the friction clutch.

There is a constant demand to be able to easily and efficiently be able to adapt a transmission of torque in a drivetrain, in particular of a hybrid motor vehicle, to different drive strategies.

SUMMARY

It is the object of the present disclosure to specify measures which permit an easy and efficient adaptation of a transmission of torque in a drivetrain, in particular of a hybrid motor vehicle, to different drive strategies.

According to the present disclosure, a clutch system is provided for coupling a drive shaft of a motor vehicle engine to at least one transmission input shaft of a motor vehicle transmission, with a friction clutch, in particular designed as a multiplate clutch, for transmitting a torque between a torque-introducing element, in particular a drive shaft of the motor vehicle engine, and a torque-discharging element, in particular a transmission input shaft of the motor vehicle transmission, a ramp system for the axial displacement of a pressure plate of the friction clutch, wherein the ramp system has an input ramp and an output ramp, which can be turned in relation to the input ramp to change an axial extent of the ramp system, a pilot clutch, which acts on the ramp system, for actuating the friction clutch on the basis of a differential speed between the torque-introducing element and the torque-discharging element, and an electromagnet for the magnetic actuation of the pilot clutch, wherein the ramp system is arranged radially on the inside in relation to the friction clutch and/or in relation to the pilot clutch.

In the regular traction mode, a torque flow can take place from the torque-introducing element to the torque-discharging element substantially via the friction clutch. As a result, a torque produced in a motor vehicle engine designed as an internal combustion engine can be transmitted to a transmission input shaft of a motor vehicle transmission in order to drive the motor vehicle. It is also possible to connect an electric machine via an output part of the friction clutch or the torque-discharging element, and therefore, in a booster mode, the motor vehicle can be additionally driven by the electric machine operated in motor mode. For purely electrical operation of the motor vehicle, with the internal combustion engine switched off, the friction clutch can be opened by the pilot clutch being opened by energizing the electromagnet. A torque flow between the torque-discharging element and the torque-introducing element is thereby interrupted, and therefore the drag torque of the internal combustion engine does not diminish the power introduced by the electric machine. In an overrun mode, the electric machine can be operated in generator mode and recover electrical energy, while the internal combustion engine and its drag torque remain decoupled due to the open pilot clutch and the open friction clutch. When a greater braking power is desired, the energizing of the electromagnet can be interrupted, and therefore the closing pilot clutch closes the friction clutch and the deactivated internal combustion engine with its drag torque can act as an additional engine brake. With the friction clutch closed, is also possible to use the electric machine to introduce a starting torque for starting the internal combustion engine. In order to change over between the individual operating modes, it is sufficient to decouple or couple the internal combustion engine by energizing the electromagnet or interrupting the energizing of the electromagnet. This makes use of the insight that the internal combustion engine should be coupled for a large part of the operating time, and therefore a normally-closed design is an energy-efficient design both for the pilot clutch and for the friction clutch. Since the ramp system is arranged radially within the friction clutch and/or the pilot clutch, in particular in nested fashion, an arrangement which saves structural space is realized, which makes it possible for the pilot clutch to be positioned at the largest possible radius. In this way, the pilot clutch can, with a short radial extent, realize a larger friction contact area, whereby structural space can additionally be saved, in particular in order for the electromagnet to be positioned radially at the inside. For the changeover of operating modes, all that is required is to use the electromagnet and the ramp system arranged radially on the inside in the case of the pilot clutch arranged radially on the outside to briefly exploit an existing speed difference between the torque-introducing element and the torque-discharging element to actuate the friction clutch, thus allowing easy and efficient adaptation of torque transmission in a powertrain, in particular that of a hybrid motor vehicle, to different driving strategies, with a small installation space requirement and while using a low amount of energy.

The pilot clutch and the friction clutch, together with a ramp system connected in between, can form a so-called booster clutch. In the closed state of the friction clutch, the torque-introducing element and the torque-discharging element have substantially the same speed in slip-free operation. In the open state of the friction clutch, the torque-introducing element and the torque-discharging element can rotate at different speeds, with the result that a speed difference arises between the torque-introducing element and the torque-discharging element. The torque flowing via the torque-introducing element and the friction clutch can flow at least partially via the at least partially closed pilot clutch, allowing torque transmission from the pilot clutch at least temporarily via the ramp system to the friction clutch in the closed state of the pilot clutch, thereby making it possible to reduce component loads. In particular, the pilot clutch brings about slip-free frictional engagement between the torque-introducing element and the torque-discharging element when the input ramp is turned in relation to the output ramp. By means of the slip-free frictional engagement, it is possible to produce in the pilot clutch a speed difference which can be used to turn the input ramp in relation to the output ramp. At the same time, it is also possible in the slipping mode to transmit a torque, which can be passed on to the ramp system in order to provide a correspondingly high contact force for a pressure plate of the friction clutch that can be displaced by the ramp system. If speed equalization between the torque-introducing element and the torque-discharging element has not yet occurred, the slipping pilot clutch can convert the speed difference into a relative rotation of the input ramp in relation to the output ramp by means of suitable coupling of the ramp system to the pilot clutch. It is thereby possible to change the axial extent of the ramp system on the basis of the speed difference within the pilot clutch and thus on the basis of the speed difference between the torque-introducing element and the torque-discharging element. By means of the changing extent of the ramp system, the pressure plate can be displaced in order to close the friction clutch, wherein a displacement force for displacing the pressure plate can be derived from the torque transmitted via the pilot clutch. Once the extent of the ramp system has changed to the extent that, for example, the pressure plate clamps a clutch disk and/or plates of a multiplate clutch, ending of the slipping mode is followed by synchronization of the speeds of the torque-introducing element and the torque-discharging element, with the result that there is no longer a speed difference. The ramp system can then stay in the position reached.

In the closed position of the friction clutch, the majority of the torque to be transmitted can take place via the friction pair(s) in the friction clutch, wherein a smaller proportion of the torque to be transmitted can be transmitted via the pilot clutch. As a result, it is possible to introduce a correspondingly high contact force into the friction clutch via the pilot clutch, thus enabling a correspondingly higher torque to be transmitted reliably and without slippage. Here, a force multiplication can be achieved through a suitable choice of ramp slope for the ramp system, thus making it possible to achieve an increased multiplied contact force with a low actuating force for the actuation of the pilot clutch. Moreover, some of the torque to be transmitted can be used to provide the contact force, and therefore the contact force can be supplied from an additional energy source. By virtue of the fact that the actuating force engages on the pressure plate only indirectly via the pilot clutch, force intensification and/or torque derivation from the torque to be transmitted can be achieved by means of the pilot clutch in order to close the friction clutch, and therefore the friction clutch can be closed frictionally using a significantly increased contact force, thereby allowing reliable closure of the friction clutch with low design complexity.

By means of the ramp slope of the ramps of the ramp system, force intensification can be achieved, with the result that the actuating force required to close the pilot clutch is significantly lower than the contact force which can be achieved at the pressure plate. As a result, the electromagnet can be of significantly smaller and more space-saving dimensions. The output ramp can be coupled to an output part of the friction clutch and/or the torque-discharging element in a manner which prevents rotation but allows axial movement, in particular via the pressure plate of the friction clutch. As a result, the output ramp, which is coupled to the torque-discharging element, and the input ramp, which can be coupled to the torque-introducing element by means of the pilot clutch, can be turned in relation to one another when there is a differential speed between the torque-discharging element and the torque-introducing element. Alternatively, the output ramp may be coupled to the torque-introducing element in an axially displaceable but torque-transmitting manner, while the input ramp can be coupled to the output part of the friction clutch and/or the torque-discharging element for conjoint rotation, in particular by means of a clutch disk of the pilot clutch. The ramps of the ramp system can slide directly on one another or can be turned in relation to one another by way of at least one ball, a cylinder or some other rotatable element, thus enabling a ball-ramp system to be formed. By virtue of the turning of the ramps in relation to one another, the distance between the rear sides of the input ramp and output ramp facing away from the other, opposite ramp in each case can change, allowing the axial extent of the ramp system to decrease or increase accordingly. As a particular preference, the maximum relative turning angle of the input ramp in relation to the output ramp is for example limited by at least one stop, thereby, for example, making it possible to avoid exceeding a maximum range of wear for friction linings of the friction clutch.

Provision is made in particular for the friction clutch to at least partially cover the ramp system as viewed in a radial direction. The ramp system may be nested in relation to the friction clutch and inserted at least partially, preferably entirely, into a radial interior space of the friction clutch. Through the use of the structural space within the friction clutch, which in particular in the case of an embodiment of the friction clutch as a multiplate clutch may offer sufficient space for the ramp system, the structural space that is provided in any case can be better utilized, whereby the overall structural space requirement of the clutch system can be reduced.

Preferably, the output ramp of the ramp system is connected to a pressure plate of the friction clutch, wherein the pressure plate extends in a radial direction and at least partially with a component in an axial direction, wherein, in particular, the pressure plate at least partially, preferably completely, covers the ramp system as viewed in a radial direction. The pressure plate can thus be of pot-like form with a cranked profile in the sectional view. In this way, the pressure plate can, radially within the friction clutch, receive the pressure force applied to the output ramp and introduce said pressure force at an axial end of the friction clutch. By means of the geometrical design of the pressure plate, which deviates from a purely disk shape in a pot-like manner, the ramp system can be inserted to a correspondingly great extent into the radial interior space of the friction clutch, which saves structural space.

The input ramp of the ramp system is particularly preferably coupled by means of a driver ring to a clutch disk element, which can be frictionally clamped between a pressure element and a counter element, of the pilot clutch, wherein the driver ring extends in a radial direction and at least partially with a component in an axial direction. An axial and radial offset of the input ramp with respect to the clutch disk element can be easily bypassed by means of the driver ring. In this way, it is not necessary for the input ramp to be arranged in a radial elongation with respect to the clutch disk element. Instead, the ramp system can be arranged so as to be offset as far as possible into the radial interior space of the friction clutch in an axial direction with respect to the pilot clutch, such that structural space for the positioning of the electromagnet can be created radially on the inside in relation to the pilot clutch.

Provision is made in particular for the clutch disk element to project radially outward out of the pilot clutch, wherein the driver ring at least partially covers the pilot clutch radially at the outside. In this way, the driver ring can be led all the way past the pressure element and the counter element without the need for the driver ring to act by means of connecting fingers, which are led through passage openings of the pressure element or of the counter element, on the input ramp, which is axially offset in relation to the pilot clutch, of the ramp system on the input ramp. The structural design is thus simplified and the outlay in terms of installation is reduced. The clutch disk element may for example be attached by means of a splined toothing in torque-transmitting but axially relatively movable fashion to the clutch disk element.

Preferably, the input ramp of the ramp system is mounted, in particular via the driver ring, on an input part, which is coupled to the torque-introducing element, of the friction clutch. The input part, in particular an inner plate carrier of a multiplate clutch, may be connected in torque-transmitting fashion to the torque-introducing element, in particular by means of a rivet connection. In this way, the input part forms a web which runs past the ramp system from radially outside and on which the input ramp of the ramp system can be mounted. In particular, the input part has a partial section which runs in an axial direction and in which a support bearing for the radial and/or axial relatively rotatable support of the input ramp on the input part may be provided. The support bearing may be fastened between shoulders and/or securing rings which act in an axial direction, in order to be able to discharge axial forces.

The pilot clutch particularly preferably has a counter element coupled to the torque-introducing element and has a pressure element which is axially displaceable relative to the counter element and which serves for frictionally clamping a clutch disk element between the pressure element and the counter element, wherein the pressure element is connected by means of a closing spring, designed in particular as a leaf spring, to the counter element. The electromagnet thus only needs to be actuated when it is sought to open the pilot clutch and the friction clutch in order to withdraw the internal combustion engine from the drivetrain. The pilot clutch is thus of "normally closed" design. By virtue of the closing spring being designed as a leaf spring, the closing spring can easily tolerate an offset of the pressure element relative to the counterpart element during the closure of the pilot clutch. The closing spring can thus simultaneously realize a compensation of a radial offset.

In particular, the electromagnet is arranged radially on the inside in relation to the friction clutch and/or in relation to the pilot clutch, wherein, in particular, the electromagnet is designed such that it can act magnetically on a pressure element of the pilot clutch. The pressure element of the pilot clutch may, for this purpose, be produced at least partially from a ferromagnetic material. The pressure element of the pilot clutch can easily project sufficiently far radially inward such that the electromagnet can magnetically act on the pressure element even in the radially inner position. The pressure element preferably runs from radially outside to radially inside, at least partially with a component in an axial direction, such that the electromagnet is nested in the pilot clutch and can be at least partially inserted into a radial interior space of the pilot clutch. By means of the positioning of the electromagnet radially on the inside in relation to the pilot clutch and/or in relation to the friction clutch, the axial structural space requirement of the clutch system can be reduced.

It is preferable if, on the output side or on the input side, the friction clutch is mounted radially on the inside by means of a radially extending supporting disk, wherein the supporting disk has an axial inner side pointing toward the friction clutch, wherein the inner side points towards the ramp system and/or the electromagnet. The ramp system and the electromagnet can thus be provided in the interior of the clutch system and at the same time be protected against external environmental influences by the supporting disk. The supporting disk can, as a cover, axially cover the ramp system and the electromagnet.

It is particularly preferable for a fixed module carrier to be provided, wherein the supporting disk is mounted on the module carrier by means of a bearing, wherein the electromagnet is fastened rotationally fixedly by means of a supporting foot to the module carrier, wherein, in particular, the bearing is supported fixedly in terms of movement in an axial direction between the module carrier and the supporting foot. By means of the fastening of the electromagnet to the module carrier by means of the supporting foot, the electromagnet can be designed to be fixed and so as not to co-rotate, such that the electrical contacting of the electromagnet is simplified. At the same time, the supporting disk can be mounted by means of the bearing indirectly via the supporting foot, or directly, on the module carrier, and in particular supported for the discharge of radial and/or axial forces. In particular, it is possible for the supporting foot that holds the electromagnet to push the bearing of the supporting disk against an axially acting shoulder of the module carrier in order to be able to support axial forces.

In particular, provided between the electromagnet and a pressure element of the pilot clutch in the axial direction is a contact plate, which is mounted and fixed in the axial direction, for axially striking against the pressure element when there is a magnetic force acting from the electromagnet on the pressure element. Direct contact of the co-rotating pressure element with the fixed electromagnetic is thereby avoided, and therefore unnecessary friction by contact surfaces moving in relation to one another is avoided. The contact plate is for example mounted on the supporting foot and/or the module carrier by means of a bearing designed for example as a ball bearing or sliding bearing. Due to its blocking function, the contact plate only needs to prevent striking against the electromagnet and, as a result, can have a considerably smaller material thickness in comparison with the supporting disk. As a result, shielding of the magnetic force produced by the electromagnet by the contact plate can be kept low. The contact plate is preferably produced from a magnetically soft or ferromagnetic material and, as a result, can positively influence the magnetic field of the electromagnet. In particular, the contact plate is mounted on the supporting foot for the electromagnet. As a result, the axial distance of the contact plate from the electromagnet can be set exactly and, because of the short tolerance chain, set to a particularly small distance.

Preferably, an output part of the friction clutch and/or the torque-discharging element has an integrated radial offset compensator, in particular a torque sensor. As a result, the opening and closing of the friction clutch by a speed difference present at the pilot clutch can take place more smoothly. Moreover, a relative rotation of involved component parts of the pilot clutch and of the friction clutch that occurs for actuation of the friction clutch can be automatically compensated. In particular, a spring element can be preloaded by the torque acting in the radial offset compensator during the closure of the friction clutch, with the result that the preloaded spring element can automatically open the friction clutch when the applied torque is no longer present. A changeover between overrun mode and traction mode can thereby be achieved in a simple manner, without the need for the action of an external control on the friction clutch or the pilot clutch.

The present disclosure also relates to a powertrain for a motor vehicle with a torque-introducing element, in particular a drive shaft of the motor vehicle engine, a torque-discharging element, in particular a transmission input shaft of the motor vehicle transmission, a clutch system, which can be embodied and refined as described above, for transmitting a torque between the torque-introducing element and the torque-discharging element, and an electric machine for transmitting a torque between the electric machine and the torque-discharging element. For the changeover of operating modes, all that is required is to use the pilot clutch to briefly exploit an existing speed difference between the torque-introducing element and the torque-discharging element to actuate the friction clutch, thus allowing easy and efficient adaptation of torque transmission in a powertrain of a hybrid motor vehicle to different driving strategies, in particular if the hybrid motor vehicle is to be driven purely electrically by the electric machine.

BRIEF DESCRIPTION OF DRAWINGS

The present disclosure is explained below with reference to the accompanying drawing on the basis of a preferred exemplary embodiment by way of example, the features that are presented below each being able to represent an aspect of the present disclosure individually or in combination. In the FIGURE:

The Single FIGURE shows a schematic sectional view of a clutch system.

DETAILED DESCRIPTION

The clutch system 10 represented in the FIGURE has a torque-introducing element 12, which is designed as a drive shaft of a motor vehicle and can be coupled to a torque-discharging element 14. The torque-discharging element 14 may be connected to a transmission input shaft of a motor vehicle transmission for conjoint rotation by means of a spline-type toothing. The coupling of the torque-introducing element 12 to the torque-discharging element 14 takes place by means of a friction clutch 16 designed as a multiplate clutch. The friction clutch 16 has an input part 18 designed as an inner plate carrier, which is connected to the torque-introducing element 12 for example in a torque-transmitting manner by means of a riveted connection. The input part 18 may interact with an output part 20, designed as an outer plate carrier, via friction pairings connected in between, in order in the closed state of the friction clutch 16 to exchange a torque between the torque-introducing element 12 and the torque-discharging element 14 or in the open state of the friction clutch 16 to interrupt a torque transmission between the torque-introducing element 12 and the torque-discharging element 14. The torque-discharging element 14 may be connected to the output part 20 in a torque-transmitting manner for example by way of a toothing. The output part 20 has a radially inwardly extending supporting disk 22, which is mounted rotatably on a module carrier 26 by way of a grooved ball bearing 24 for supporting radial and axial loads. The supporting disk 22 has an axial inner side 28 facing the friction clutch 16.

For actuating the friction clutch 16, a pilot clutch 30 is provided, which can optionally be actuated with the aid of an electromagnet 32 which is fastened fixedly in terms of movement via a supporting foot 34 to the module carrier 26. When the electromagnet 32 is energized, in order to open the pilot clutch 30 and consequently the friction clutch 16, the electromagnet 32 can magnetically attract an at least partially ferromagnetic pressure element 36 of the pilot clutch 30. With the aid of the pressure element 36, a clutch disk element 38 can be frictionally clamped between the pressure element 36 and a counter element 40 connected to the torque-introducing element 12 for conjoint rotation to close the pilot clutch 30. In the exemplary embodiment represented, the pilot clutch 30 is designed as a single-disk friction clutch. The pressure element 36 is coupled to the counter element 40 by means of a closing spring 42 designed as a leaf spring, and therefore the pilot clutch 30 can be closed automatically by the closing spring 42 ("normally closed") when no magnetic force applied by the electromagnet 32 is acting on the pressure element 36.

The clutch disk element 38 can be used to actuate a ramp system 44. For this purpose, the clutch disk element 38 may for example be coupled by means of a spline toothing to a driver ring 46 which runs in a radial direction and in an axial direction and which, in the illustrated exemplary embodiment, is mounted by means of a supporting bearing 48 on the input part 18 of the friction clutch 16. The driver ring 46 is coupled rotationally conjointly to an input ramp 50 of the ramp system 44, such that, in the closed state of the pilot clutch 30, the input ramp 50 rotates with the rotational speed of the torque-introducing element 12. The input ramp 50 is mounted by means of the driver ring 46 on the input part 18. The input ramp 50 interacts with an output ramp 54 via a ball 52. The output ramp 54 is coupled rotationally conjointly to a pressure plate 56, which runs in a pot-like manner in a radial direction and in an axial direction, of the friction clutch 16. The pressure plate 56 is coupled rotationally conjointly but axially movably to the output part 20, such that the output ramp 54 is coupled by means of the pressure plate 56 likewise to the output part 20, which rotates at the rotational speed of the torque-discharging element 14.

In the open state of the friction clutch 16, there is a speed difference between the torque-introducing element 12 and the torque-discharging element 14. With the pilot clutch 30 open, the input ramp 50 mounted rotatably by means of the supporting bearing 48 can rotate along with and at the speed of the output ramp 54, and therefore there is no relative rotation of the input ramp 50 in relation to the output ramp 54. With the pilot clutch 30 closed, a speed difference corresponding to the speed difference of the torque-introducing element 12 in relation to the torque-discharging element 14 occurs between the input ramp 50 and the output ramp 54, and therefore the input ramp 50 can turn in relation to the output ramp 54. As a result, the axial extent of the ramp system 44 can increase, and therefore the pressure plate 56 of the friction clutch 16 that is coupled to the output ramp 54 can be axially displaced together with the output ramp 54, in order to close the friction clutch 16, whereby the speeds of the input ramp 50 and the output ramp 54 are equalized.

In the closed state of the friction clutch 16, a torque flow from the torque-introducing element 12 to the torque-discharging element 14 can take place in traction mode. It is additionally possible that a rotor of an electric machine is attached to a radial outer surface 58 of the output part 20, and therefore the electric machine can also introduce a torque in a boost mode.

For the open state of the friction clutch 16, the electromagnet 32 is energized and attracts the pressure element 36 to it. The pressure element 36 that is magnetically attracted by the electromagnet 32 and rotates at the speed of the torque-introducing element 12 strikes against a contact plate 62 rotatably mounted on the supporting foot 34 and the module carrier 26 by means of an auxiliary bearing 60, and therefore direct contact of the rotating pressure element 36 with the fixed electromagnet 32 is avoided. The contact plate 62 can rotate along with and at the speed of the pressure element 36. The magnetically displaced pressure element 36 is used to lift off the pilot clutch 30 against the spring force of the closing spring 42, and therefore the pilot clutch 30 opens. As a result, the input ramp 50 is no longer supported on the torque-introducing element 12 by way of the clutch disk element 38 and the pilot clutch 30, with the result that the restoring spring and/or a lining suspension of the friction clutch can press the ramp system 44 together, whereby the extent of the ramp system 44 is reduced. As a result, the pressure plate 56 is at the same time displaced axially into a position in which the friction clutch 16 is open and a torque transmission between the torque-introducing element 12 and the torque-discharging element 14 is interrupted. In this state of the clutch system 10, the electric machine can drive the motor vehicle purely electrically in motor mode or can recover electrical energy from the powertrain in generator mode.

The ramp system 44 is inserted into a radial interior space of the friction clutch 16, such that a nested construction is realized in which the friction clutch 16, as viewed in a radial direction, covers a major part of the ramp system 44, in particular the entire ramp system 44. The axial component of the profile of the pressure plate 56 and of the driver ring 46 permit this. Furthermore, the electromagnet 32 is at least partially inserted into a radial interior space of the pilot clutch 30, resulting in a nested construction in which the pilot clutch 30, as viewed in a radial direction, covers a part of the electromagnet 32. For this purpose, the pressure element 36 and the counter element 40 may run with a component in an axial direction, whereas the clutch disk element 38 projects radially outward out of the pilot clutch 30. The ramp system 44 and the electromagnet 32 are, in an axial direction, arranged in a protected and structural-space-saving manner between the inner side 28 of the support disk 22 and the torque-discharging element 14.

LIST OF REFERENCE NUMBERS

- 10 Clutch system
- 12 Torque-introducing element
- 14 Torque-discharging element
- 16 Friction clutch
- 18 Input part
- 20 Output part
- 22 Supporting disk
- 24 Grooved ball bearing
- 26 Module carrier
- 28 Inner side
- 30 Pilot clutch
- 32 Electromagnet
- 34 Supporting foot
- 36 Pressure element
- 38 Clutch disk element
- 40 Counter element
- 42 Closing spring
- 44 Ramp system
- 46 Driver ring
- 48 Supporting bearing
- 50 Input ramp
- 52 Ball
- 54 Output ramp
- 56 Pressure plate
- 58 Outer surface
- 60 Auxiliary bearing
- 62 Contact plate

The invention claimed is:

1. A clutch system for coupling a drive shaft of a motor vehicle engine to a transmission input shaft of a motor vehicle transmission, comprising:
   - a friction clutch for transmitting a torque between a torque-introducing element and a torque-discharging element,
   - a ramp system for an axial displacement of a pressure plate of the friction clutch, wherein the ramp system has an input ramp and an output ramp, which can be turned in relation to the input ramp to change an axial extent of the ramp system,
   - a pilot clutch, which acts on the ramp system, for actuating the friction clutch based on a differential speed between the torque-introducing element and the torque-discharging element, and
   - an electromagnet for a magnetic actuation of the pilot clutch,
   - wherein the ramp system is arranged radially within the friction clutch or the pilot clutch, and
   - wherein the pilot clutch has a counter element coupled to the torque-introducing element and has a pressure element which is axially displaceable relative to the counter element and which serves for frictionally clamping a clutch disk element between the pressure element and the counter element, wherein the pressure element is connected by a closing spring to the counter element.

2. The clutch system as claimed in claim 1, wherein the friction clutch at least partially covers the ramp system in a radial direction.

3. The clutch system as claimed in claim 1, wherein the output ramp of the ramp system is connected to a pressure plate of the friction clutch, wherein the pressure plate extends in a radial direction and at least partially with a component in an axial direction, wherein the pressure plate at least partially covers the ramp system in the radial direction.

4. The clutch system as claimed in claim 1, wherein the input ramp of the ramp system is coupled by a driver ring to a clutch disk element, which can be frictionally clamped between a pressure element and a counter element, of the pilot clutch, wherein the driver ring extends in a radial direction and at least partially with a component in an axial direction.

5. The clutch system as claimed in claim 4, where the clutch disk element projects radially outward out of the pilot clutch, wherein the driver ring at least partially covers the pilot clutch radially at an outside thereof.

6. The clutch system as claimed in claim 1, wherein the electromagnet is arranged radially within the friction clutch or the pilot clutch, wherein the electromagnet is designed such that it can act magnetically on a pressure element of the pilot clutch.

7. The clutch system as claimed in claim 1, wherein, on an output side or on an input side, the friction clutch is mounted radially on an inside by a radially extending supporting disk, wherein the supporting disk has an axial inner side pointing toward the friction clutch, wherein the axial inner side points towards the ramp system or the electromagnet.

8. The clutch system as claimed in claim 7, further comprising a fixed module carrier, wherein the supporting disk is mounted on the module carrier by a bearing, wherein the electromagnet is fastened rotationally fixedly by a supporting foot to the module carrier, wherein the bearing is supported fixedly in terms of movement in an axial direction between the module carrier and the supporting foot.

9. The clutch system as claimed in claim 1, wherein between the electromagnet and a pressure element of the pilot clutch in an axial direction is a contact plate, which is mounted and fixed in the axial direction, for axially striking against the pressure element when there is a magnetic force acting from the electromagnet on the pressure element.

10. A clutch system for coupling a drive shaft of a motor vehicle engine to a transmission input shaft of a motor vehicle transmission, comprising:
    a friction clutch configured to transmit a torque between a torque-introducing element and a torque-discharging element,
    a ramp system configured to axially displace a pressure plate of the friction clutch, wherein the ramp system has an input ramp and an output ramp, the output ramp being movable in relation to the input ramp to change an axial extent of the ramp system,
    a pilot clutch configured to actuate the friction clutch based on a differential speed between the torque-introducing element and the torque-discharging element, and
    an electromagnet arranged for a magnetic actuation of the pilot clutch, wherein axially between the electromagnet and a pressure element of the pilot clutch, a contact plate is mounted and fixed in an axial direction for axially striking against the pressure element when there is a magnetic force acting from the electromagnet on the pressure element, and
    wherein the pressure element of the pilot clutch is coupled to a counter element, which is connected to the torque-introducing element, by a closing spring, and the pilot clutch is configured to close automatically by the closing spring when no magnetic force applied by the electromagnet is acting on the pressure element.

11. The clutch system of claim 10, wherein when the electromagnet is energized and in order to open the pilot clutch, the electromagnet is configured to attract the pressure element of the pilot clutch.

12. The clutch system of claim 10, wherein a clutch disk element is arranged to be frictionally clamped between the pressure element of the pilot clutch and a counter element connected to the torque-introducing element for conjoint rotation to close the pilot clutch.

13. The clutch system of claim 12, wherein the clutch disk element is coupled to a driver ring, wherein the driver ring is mounted on an input part of the friction clutch, wherein the driver ring is coupled rotationally conjointly to the input ramp of the ramp system, such that, in a closed state of the pilot clutch, the input ramp rotates with a rotational speed of the torque-introducing element.

* * * * *